Patented May 24, 1938

2,118,766

UNITED STATES PATENT OFFICE 2,118,766

TREATMENT OF HYDROCARBON OILS USING SULPHONYL HALIDES

Josef Moos and Hans Ramser, New York, N. Y., assignors to Edeleanu Gesellschaft, m. b. H., a corporation of Germany No Drawing. Application December 19, 1936, Serial No. 116,818. In Germany July 16, 1936

19 Claims. (Cl. 196—13)

This invention relates to the treatment of hydrocarbon oils, and is an improvement in processes of refining and dewaxing of such oils by the use of a solvent or a mixture of solvents having a selective action upon the constituents of the oil being treated.

The invention relates likewise to the treatment of hydrocarbon oils derived from natural sources as well as to hydrocarbon oils obtained in a cracking process. It also relates to the treatment of hydrocarbon oils which have been produced by a synthetic process.

The invention also contemplates solvent extraction as well as solvent dewaxing of oils by a continuous process of treatment whereby constituents of different chemical composition are separated by phase separation or crystallization.

It is known that for the purpose of dewaxing an oil a solvent is desirable which has a very low solubility for wax at an economical dewaxing temperature, for removal of asphaltic matter likewise a solvent is required that has little or no solvent effect on these asphaltic bodies, and for selectively extracting aromatic, unsaturated and other groups from the oil the solvent should selectively dissolve these groups while leaving other groups such as paraffinic and naphthenic ones undissolved; but only few solvents, such as, for instance, dichlorodifluoromethane, are known to be satisfactory for all these purposes.

The invention consists essentially in the treatment of hydrocarbon oils with solvents which belong to the groups of organic sulphonyl halides having the general formula $$R-(SO_2Hal)_n$$

where R represents either an alkyl- or aryl-group or derivative thereof and where Hal is either chlorine, bromine, iodine or fluorine; $n$ may be 1, 2 or 3 according to the number of $SO_2Hal$-groups present in the molecule.

Examples of solvents belonging to the above defined group are the following compounds:

$(CH_3)SO_2Cl$, $(CCl_3)SO_2Cl$, $(C_5H_{11})SO_2Cl$, $(C_2H_4Cl)SO_2Cl$, $(CH_2)(SO_2Cl)_2$, $(CH)(SO_2Cl)_3$, $(C_6H_5)SO_2Cl$, $(C_{10}H_7)SO_2Cl$, $(C_6H_{11})SO_2Cl$, $(C_6H_4)(Br)SO_2Cl$, $(C_6H_4)(NO_2)SO_2Cl$, $(C_6H_4)(CH_3)SO_2Cl$, $(C_6H_3)(CH_3)(NO_2)SO_2Cl$, $(C_6H_3)(Cl_2)SO_2Cl$, $(C_6H_3)(Cl)(Br)SO_2Cl$, $(C_6H_4)(SO_2Cl)_2$, $C_6H_3(SO_2Cl)_3$, $C_{10}H_5(SO_2Cl)_3$, $(C_6H_5)SO_2F$, $(C_2H_5)SO_2F$, $(C_2H_5)SO_2Br$, $C_2H_5SO_2Cl$, $n-(C_3H_7)SO_2Cl$, iso-$(C_3H_7)SO_2Cl$, $n-(C_3H_7)SO_2F$, iso-$(C_3H_7)SO_2F$, $n-(C_4H_9)SO_2Cl$, $n-(C_4H_9)SO_2F$, and $n-(C_5H_{11})SO_2F$ In these sulphonyl halides the halogen—that is chlorine, bromine or fluorine—is directly linked to the sulphur atom, and not to any one of the carbon atoms, which distinguishes our selective solvents from other organic sulphur compounds such as, for example, thio-ethers. This may be clearly seen from the formulas of the following sulphonyl halides, the general formulas of which are given above:

Ethyl-sulphonyl-chloride

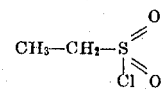

Chloro-ethyl-sulphonyl-chloride

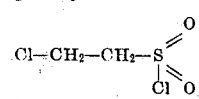

Methyl-di-sulphonyl-chloride

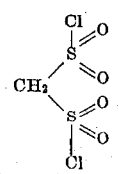

Benzyl-sulphonyl-fluoride

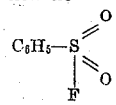

We have found that these alkyl- and aryl sulphonyl-halides (hereinafter referred to as our solvents) are highly selective solvents for those groups the removal of which from the hydrocarbon oils is the object of the art of solvent extraction. They are, furthermore, stable which is essential from the viewpoint of solvent losses, and they can easily be removed from the oil.

While the invention relates primarily to the utilization of one or another of these halides for refining hydrocarbon oils, it is also an object of this invention to modify the action thereof by the use of other solvents in admixture therewith, such a mixture consisting of one or more of the halides specified and an auxiliary solvent or solvents the addition of which affects the solvent power, selectivity, viscosity, or other physical or chemical qualities of the solvent mixture.

The quantities of solvent we apply for extracting hydrocarbon oils may vary between one-half and approximately five volumes of solvent to one volume of oil, these ratios being dependent on the physical properties of the raw oil and on the desired refining effect.

Our solvents may be used in various ways as desired. If used in batch treatment the oil and solvent are charged into a tank, agitated and then allowed to settle at a temperature most suitable for the selective action of the solvent. The mixture separates then into two layers, one of which contains the hydrocarbon groups having a relatively low critical solution temperature with the solvent and which are dissolved in the bulk of the solvent while the other layer consists of hydrocarbon groups having a relatively high critical solution temperature with the solvent and which hold in solution a comparatively small amount of solvent.

It is within the scope of our invention to extract hydrocarbon oils with our organic sulphonyl halides in the presence of auxiliary solvents admixed with our solvents for the purpose of varying the solvent power or the selectivity. This may be done in various ways. We may either mix the auxiliary solvent with our selective solvent and treat the raw hydrocarbon oil with this mixture, or we may prefer to apply our selective solvents to a prepared mixture of the oil with the auxiliary solvent, or we may first treat the oil with one of our selective solvents and subsequently treat the raffinate thus obtained with a mixture of the selective and the auxiliary solvent. We may also first treat the oil with our solvent in conjunction with one or more auxiliary solvents and subsequently apply our solvent in admixture with a different auxiliary solvent for re-treating the oil.

As auxiliary solvents which may with advantage be used for extracting in conjunction with our solvents we wish to mention hydrocarbons, both saturated and unsaturated of the aliphatic and aromatic series, or derivatives thereof containing halogen.

In certain cases the raffinate obtained by extracting hydrocarbon oils with our solvents may not be sufficiently freed of color-impairing or other undesirable matter. In such a case we may apply a small amount of acid or clay for improving the quality of this raffinate. The treatment with suphuric acid, for example, may be carried out at a phase of the process, where our solvent has not yet been removed from the oil.

We have found that our solvents are suitable for dewaxing hydrocarbon oils as well as for extracting the same. The physical property that makes them excellent dewaxing solvents is their low solubility for paraffine wax. It is an outstanding feature of our solvents that this low solubility for wax prevails at comparatively high temperatures. Ethyl sulphonyl chloride, for instance, at 40° C. has a solubility of only 0.3% paraffine wax with a melting point of 50° C. It is within the scope of our invention to utilize the organic sulphonyl halides of the groups specified herein for dewaxing hydrocarbon oils either in combination with the process of extracting the same, with or without the aid of other solvents, or for the step of dewaxing alone.

An important advantage of our invention is that for dewaxing purposes an auxiliary solvent may be used in combination with the organic sulphonyl halides of the groups specified, whereby the latter effect precipitation of the wax while the auxiliary solvent serves chiefly for decreasing the viscosity of the mixture. The compounds hereinabove specified as suitable auxiliary extracting solvents are equally suitable as auxiliary dewaxing solvents.

The dewaxing of the hydrocarbon oil may be accomplished in combination with extraction in the following way: The oil is mixed with the solvent at a temperature at which no separation into an extract and raffinate phase occurs and at which the paraffine wax is precipitated due to its low solubility in the solvent. The precipitated wax is removed from the oil-solvent solution by means of filtration or centrifuging or any other customary method. The remaining solution is then cooled down until phase separation into raffinate and extract takes place. The two phases are separately transferred into suitable solvent recovery systems for removal of the solvent from the oil. Likewise the solvent contained in the wax from the dewaxing step is recovered for re-use in any desired manner.

Instead of first dewaxing an oil and then subjecting it to extraction we may do the reverse. In such case, instead of first recovering the solvent from the raffinate obtained in the process of extraction we may simply add an additional amount of pure solvent to that raffinate solution and then bring it to the temperature at which the wax is precipitated from the solution. For example, we may add from one to four volumes of the solvent to the raffinate as obtained in the extraction step, or—if treatment with sulphuric acid has followed the extraction step—to the neutralized raffinate, and then bring the solution to a temperature at which the raffinate is completely miscible with the solvent while there is substantially no wax dissolved in the latter. This mixture is then subjected to one of the above described methods for removing the wax and for recovering the solvent.

If a temperature below room temperature is required for the application of our solvents for any purpose herebefore described we may mix the oil with part of the solvent in conjunction with a liquid refrigerant that will not interfere with the desired action of the solvent, and effect cooling of the mixture by subsequent volatilization at reduced pressure of all or part of the refrigerant. Likewise we may cool the solvent itself by direct injection and subsequent volatilization of the refrigerant. A liquefied, normally gaseous compound, such as a low boiling hydrocarbon, or $SO_2$, $CO_2$ or any other common refrigerant of suitable boiling point may successfully be used for this purpose.

Our invention has the added advantage that we may successfully utilize an auxiliary solvent which is also a suitable refrigerant and utilize it as such in the step of treating a hydrocarbon oil with such a solvent mixture.

Our solvents may be recovered from the oil or wax either by means of distillation, by means of crystallization or by means of extracting them from the oil with the aid of another solvent that is not miscible with the oil.

In commercial operation the step of extracting hydrocarbon oils with our solvents may be performed in any conventional extraction equipment, such as an extraction tower in which solvent and oil pass through one another in true counter current fashion, or a plurality of mixing and settling steps may be employed in which a step-wise counter current extraction can be performed.

The following examples serve to illustrate the improvement achieved by the application of our process for refining and dewaxing hydrocarbon oils.

Example 1

A Midcontinent heavy lubricating stock was treated with 150% ethylsulphonylchloride ($C_2H_5SO_2Cl$) at $+60°$ F. The data of the original oil and those of the raffinate obtained with ethylsulphonylchloride, after removal of the solvent, were as follows:

|  | Original stock | Raffinate |
| --- | --- | --- |
| Yield vol., percent | 100 | 84 |
| Degrees A. P. I. | 23.2 | 27.0 |
| Vis. at 100° F | 1237 | 839 |
| Vis. at 210° F | 92 | 79 |
| Viscosity index | 78 | 92 |
| Carbon residue | 1.9 | 0.49 |

Example 2

A Midcontinent heavy lubricating stock was treated with 150 vol. % of a mixture consisting of 75 vol. % ethylsulphonylchloride ($C_2H_5SO_2Cl$) and 25 vol. % benzol at $+50°$ F. The data of the original oil and those of the raffinate obtained with this mixture were as follows:

|  | Original stock | Raffinate |
| --- | --- | --- |
| Yield vol. percent | 100 | 75 |
| Degrees A. P. I. | 23.2 | 28.1 |
| Vis. at 130° F | 484 | 317 |
| Vis. at 210° F | 92 | 77.5 |
| Viscosity index | 78 | 97 |
| Carbon residue | 1.9 | 0.39 |

Example 3

The same Midcontinent dewaxed stock described in Example 1 was treated at 23° F. with 225% of benzylsulphonyl fluoride ($C_6H_5SO_2F$) in three batches of 75% each (as compared to the volume of the stock) and the raffinate contacted with 10% clay by weight at 450° F. The raffinate, after removal of the clay and solvent, had the following characteristics:

| Yield | per cent | 68.5 |
| --- | --- | --- |
| Degrees A. P. I. | | 29.0 |
| Vis. at 100° F | | 730 |
| Vis. at 210° F | | 67.8 |
| Viscosity index | | 97 |
| Carbon residue | | 0.22 |
| Color N. P. A | | 5 |

Example 4

A Midcontinent wax bearing stock with a viscosity of 110 Saybolt at 210° F. and pour point of 110° F. was completely dissolved in 400 vol. % of a mixture of 30 vol. % ethylsulphonylchloride and 70 vol. % toluol at room temperature. The oil solution was cooled down to $+14°$ F., whereby the wax crystallized out. The wax was removed from the solution by filtration. The solvent was recovered from the oil by distillation. The solvent-free oil had a pour point of $+15°$ F.

Among the advantages of the present invention are the avoidance of losses due to chemical reaction; solvents are used which can be readily recovered for re-use; a wide range of products are obtained of improved qualities; and the cost of refining is lowered by the uniform and continuous nature of the process.

While specifications and examples given hereinabove refer to pure chemical compounds, it is understood that also technical products containing these compounds as essential constituents are suitable for the purposes of our invention.

Wherever the expression "organic sulphonyl halides" is used in the claims, it is meant to define alkyl sulphonyl halides as well as aryl sulphonyl halides, the terms "alkyl" and "aryl" standing for aliphatic and aromatic respectively, in accordance with the phraseology commonly used in the organic literature.

Obviously many modifications and variations of the invention, as hereinbefore set forth, may be made without departing from the spirit and scope thereof, and therefore only such limitations should be imposed as are indicated in the claims.

We claim:

1. The process which comprises extracting hydrocarbon oils at suitable temperatures with a selective solvent of the class consisting of organic sulphonyl halides having the general formula $R-(SO_2Hal)_n$ in which R stands for an aliphatic or aromatic radical, effecting a separation into two layers, separating the layers from each other and recovering the solvent therefrom.

2. A process for extracting hydrocarbon oils according to claim 1 in which the selective solvent is used in conjunction with an auxiliary solvent which modifies the selectivity and solvent power of the selective solvent.

3. A process for dewaxing hydrocarbon oils which comprises diluting the oil with a solvent of the class consisting of organic sulphonyl halides having the general formula $R-(SO_2Hal)_n$, in which R stands for an aliphatic or aromatic radical, and separating the paraffine wax from the solution at a low temperature.

4. A process for dewaxing hydrocarbon oils according to claim 3 in which a solvent mixture is used comprising an organic sulphonyl halide and an auxiliary solvent which is completely miscible with the oil at the dewaxing temperature.

5. A process for separating out undesirable constituents from hydrocarbon oils which comprises diluting such hydrocarbon oils with a solvent of the class consisting of organic sulphonyl halides having the general formula $R-(SO_2Hal)_n$, in which R stands for an aliphatic or aromatic radical, effecting a phase separation and separating the layer containing undesirable constituents from the other layer which is substantially free from said constituents.

6. The process of producing lubricating oils which comprises dissolving hydrocarbon oils at a suitable temperature in a solvent of the class consisting of organic sulphonyl halides having the general formula $R-(SO_2Hal)_n$, in which R stands for an aliphatic or aromatic radical, in combination with an auxiliary solvent, lowering the temperature of the oil-solvent solution to separate out the wax and removing the latter, and adjusting the proportions of the solvents and the temperature to effect complete separation of the oil-solvent mixture into raffinate and extract phases containing the desirable and undesirable constituents of the oil, respectively.

7. A process for producing lubricating oils according to claim 1 wherein ethyl sulphonyl chloride is the selective solvent.

8. A process for producing lubricating oils according to claim 3 wherein ethyl sulphonyl chloride is the selective solvent.

9. A process for producing lubricating oils according to claim 5 wherein ethyl sulphonyl chloride is the selective solvent.

10. A process for producing lubricating oils according to claim 6 wherein ethyl sulphonyl chloride is the selective solvent.

11. A process for producing lubricating oils according to claim 1 wherein benzyl sulphonyl fluoride is the selective solvent.

12. A process for producing lubricating oils according to claim 3 wherein benzyl sulphonyl fluoride is the selective solvent.

13. A process for producing lubricating oils according to claim 5 wherein benzyl sulphonyl fluoride is the selective solvent.

14. A process for producing lubricating oils according to claim 6 wherein benzyl sulphonyl fluoride is the selective solvent.

15. A process for dewaxing hydrocarbon oils which comprises diluting the oil with ethyl sulphonyl chloride and an auxiliary solvent which is completely miscible with the oil at the dewaxing temperature.

16. A process for dewaxing hydrocarbon oils which comprises diluting the oil with benzyl sulphonyl fluoride and an auxiliary solvent which is completely miscible with the oil at the dewaxing temperature.

17. A process for dewaxing a wax-containing hydrocarbon oil by dissolving said hydrocarbon oil in one to six times its volume of a mixture comprising a solvent of the class consisting of organic sulphonyl halides having the general formula $R-(SO_2Hal)_n$ in which R stands for an aliphatic or aromatic radical and a solvent of the class of aromatic hydrocarbons, said mixture to contain from 50 to 85% by volume of aromatic hydrocarbons, cooling the solution of hydrocarbon oil in the solvent mixture, removing the wax therefrom mechanically and recovering the solvents by distillation from the dewaxed oil and from the wax.

18. A process for dewaxing a wax-containing hydrocarbon oil by dissolving said hydrocarbon oil in one to six times its volume of a mixture comprising ethyl sulphonyl chloride and a solvent of the class of aromatic hydrocarbons, said mixture to contain from 50 to 85% by volume of aromatic hydrocarbons, cooling the solution of hydrocarbon oil in the solvent mixture, removing the wax therefrom mechanically and recovering the solvents by distillation from the dewaxed oil and from the wax.

19. A process for dewaxing a wax-containing hydrocarbon oil by dissolving said hydrocarbon oil in one to six times its volume of a mixture comprising ethyl sulphonyl chloride and toluol, said mixture to contain 70% by volume of toluol, cooling the solution of hydrocarbon oil in the solvent mixture, removing the wax therefrom mechanically and recovering the ethyl sulphonyl chloride and the toluol by distillation from the dewaxed oil and from the wax.

JOSEF MOOS.
HANS RAMSER.